(12) United States Patent
Ben-David

(10) Patent No.: US 6,273,622 B1
(45) Date of Patent: *Aug. 14, 2001

(54) DATA COMMUNICATION PROTOCOL FOR MAXIMIZING THE PERFORMANCE OF IP COMMUNICATION LINKS

(75) Inventor: Ido Ben-David, Binyamina (IL)

(73) Assignee: Flash Networks, Ltd., Herzelia (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/838,074

(22) Filed: Apr. 15, 1997

(51) Int. Cl.[7] .................................................. G06F 13/00
(52) U.S. Cl. ................................. 395/200.6; 395/200.57
(58) Field of Search ...................... 395/200.57, 200.66, 395/200.67, 200.68, 200.6

(56) References Cited

U.S. PATENT DOCUMENTS

| | | | |
|---|---|---|---|
| 4,839,798 | 6/1989 | Eguchi et al. | 105/709 |
| 4,984,264 | 1/1991 | Katsube | 230/370 |
| 5,371,852 | 12/1994 | Attanasio et al. | 245/709 |
| 5,375,207 | 12/1994 | Blakely et al. | 203/709 |
| 5,389,773 | * 2/1995 | Coutts et al. | 705/43 |
| 5,491,693 | 2/1996 | Britton et al. | 401/370 |
| 5,509,122 | 4/1996 | Bartow et al. | 227/709 |
| 5,515,508 | 5/1996 | Pettus et al. | 203/709 |
| 5,619,645 | 4/1997 | Montenegro et al. | 48/714 |
| 5,675,741 | * 10/1997 | Aggarwal et al. | 395/200.72 |
| 5,706,437 | * 1/1998 | Kirchner et al. | 395/200.33 |
| 5,717,690 | * 2/1998 | Peirce, Jr. et al. | 370/389 |
| 5,754,774 | * 5/1998 | Bittinger et al. | 395/200.33 |
| 5,758,087 | * 5/1998 | Aaker et al. | 395/200.62 |
| 5,781,552 | * 7/1998 | Hashimoto | 370/447 |

FOREIGN PATENT DOCUMENTS

0624016 A2    11/1994    (EP) .

* cited by examiner

*Primary Examiner*—Patrice Winder
(74) *Attorney, Agent, or Firm*—Needle & Rosenberg, P.C.

(57) ABSTRACT

The present invention provides a protocol and associated method for enhancing the throughput and response time performance of Transmission Control Protocol/Internet Protocol (TCP/IP) applications and services in Internet and Intranet environments that use the TCP/IP protocol suite, e.g., HTTP Internet browsers, HTTP servers, FTP servers, etc. The protocol of the present invention, termed Communication Enhancement Protocol (CEP), comprises a flow control method that functions to maximize the performance of IP communication links. The CEP is positioned in either Transport Layer 4 or Session Layer 5 of the OSI communications protocol stack. The CEP of the present invention optimizes the interactions between transport protocols and applications by utilizing novel flow control algorithms so as to reduce overhead and the use of the server's resources. Using the CEP of the present invention, data throughput and response time up to 2.5 times as fast as compared with conventional communication protocols. The CEP also comprises an error handling mechanism that permits detection of and recovery from packet loss and extreme network congestion.

8 Claims, 16 Drawing Sheets

FIG.6 /1
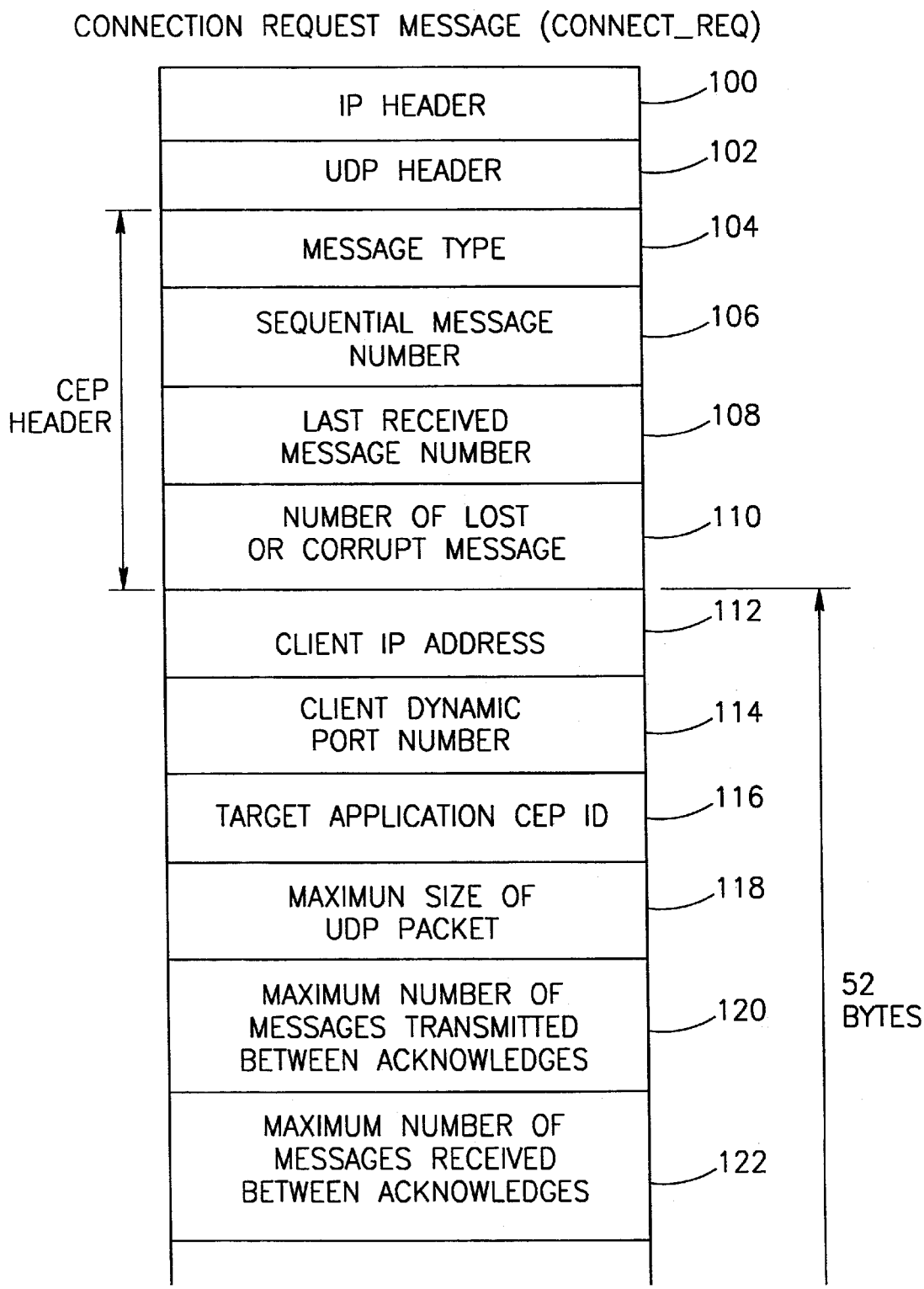

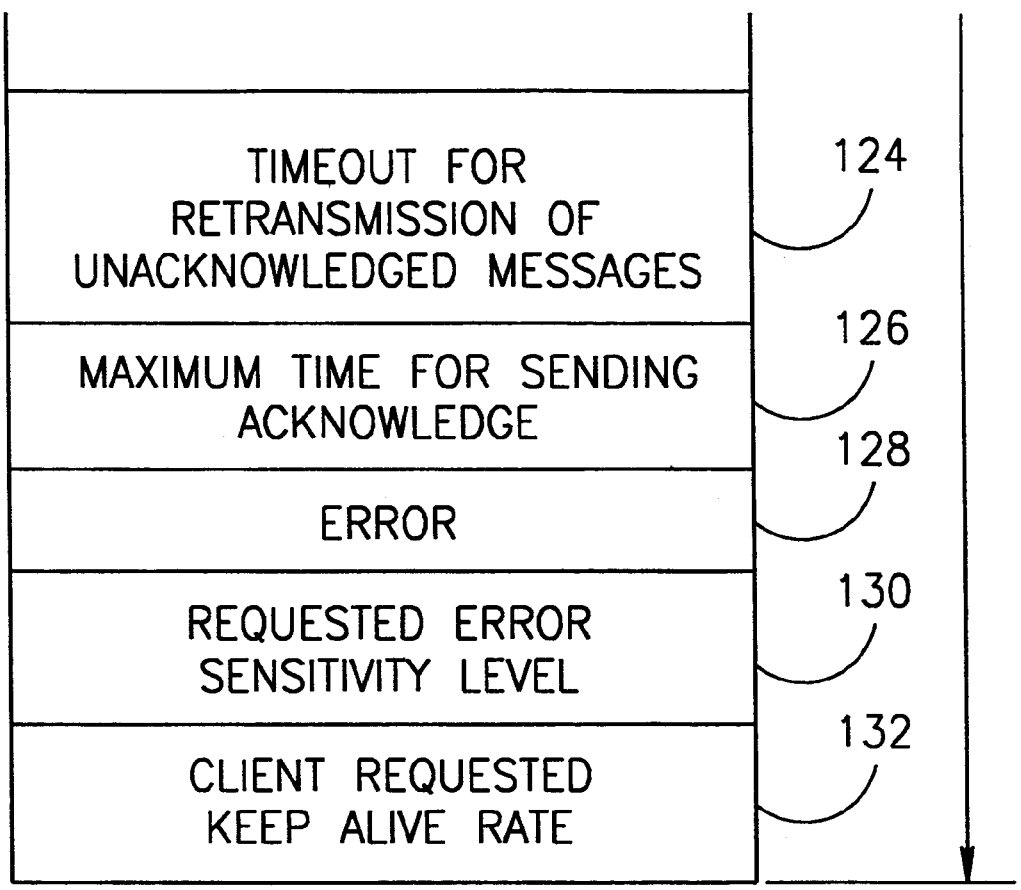
FIG.6/2

FIG.7 /1
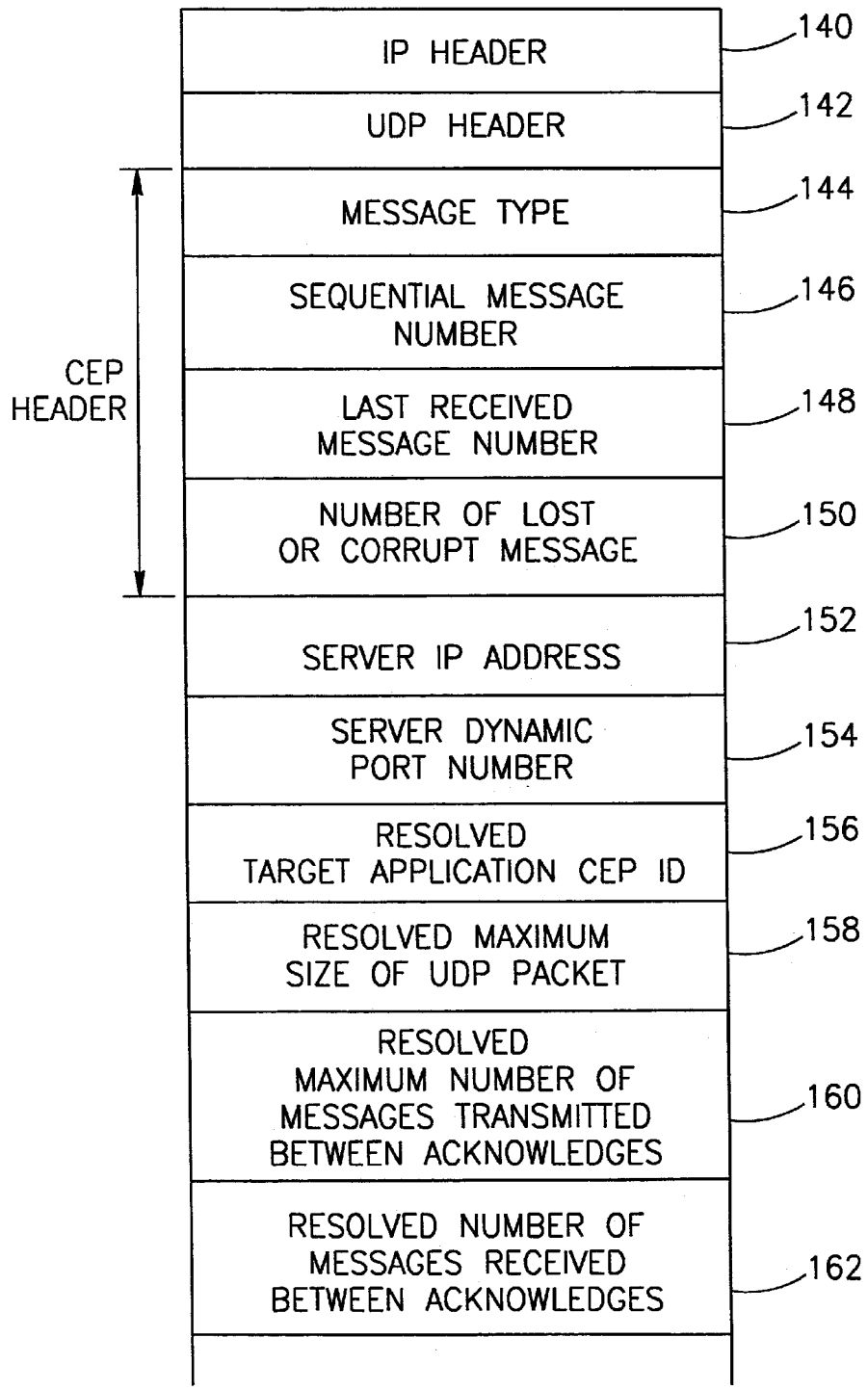

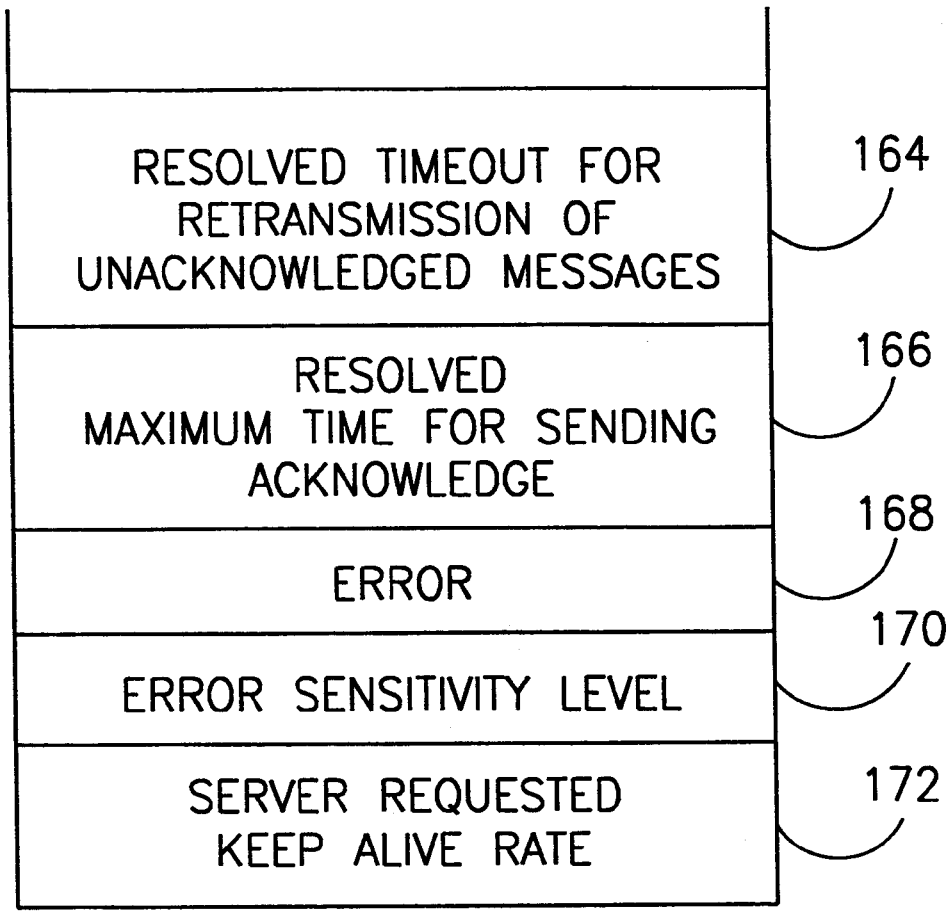
FIG.7/2

DATA COMMUNICATION PROTOCOL FOR MAXIMIZING THE PERFORMANCE OF IP COMMUNICATION LINKS

FIELD OF THE INVENTION

The present invention relates generally to data communication protocols and more particularly relates to a protocol for enhancing data communication over the Internet and other TCP/IP networks.

BACKGROUND OF THE INVENTION

In recent years the global data communication network known as the Internet has experienced explosive growth. It is estimated that since 1991, the number of Internet (also known as simply the Net) users has doubled on an annual basis and is estimated to reach 120 million users by the end of 1997. This phenomenal growth will lead to approximately 200 million Internet users by the year 2000. It is also predicted that by the turn of the century, more than 70% of all personal computers (PCs) will be on the Net and that electronic mail (e-mail) and other on-line services will be in wide spread use.

Simultaneously with the ever increasing demand for additional bandwidth, the Internet is likely to become a critical communication tool for business. Large organizations will use it as a major marketing channel. Banks, airlines, retailers and other service providers will offer their customers communications via the Internet much as they today offer their customers communication via a toll free access number.

However, it has been reported that Internet users are already experiencing severe communications constraints due to the inefficient handling of existing protocols and to the overload of the Internet. As the load conditions on the Internet become heavier and heavier, network response time will get slower and slower and the congestion rate will increase will lead to higher levels of packet loss thus lowering the performance of the network.

In addition, concurrent with the tremendous growth of the number of the traditional Internet, there is a huge increase in the number of intranets. Intranets are private networks created by organizations which use protocols and standards similar to the public Internet and are accessible to authorized users only. Intranets are used by corporations to permit employees Internet access as well as to share corporate information, product data, schedules, technical support, etc. Intranets are especially useful to organizations as the number of nomadic employees and telecommuters rapidly increases because they enable collaborative work sharing regardless of employees' physical locations. It is likely that in the future, Intranets will provide quick and easy communications between a corporation and its customers and suppliers.

SUMMARY OF THE INVENTION

The present invention provides a protocol and associated method for enhancing the throughput and response time performance of Transmission Control Protocol/Internet Protocol (TCP/IP) applications and services in Internet and Intranet environments that use the TCP/IP protocol suite, e.g., HTTP Internet browsers, HTTP servers, FTP servers, etc. The protocol of the present invention, termed Communication Enhancement Protocol (CEP), comprises a flow control method that functions to maximize the performance of IP communication links. The CEP is positioned in either Transport Layer 4 or Session Layer 5 of the OSI communications protocol stack. The CEP of the present invention optimizes the interactions between transport protocols and applications by utilizing novel flow control algorithms so as to reduce overhead and the use of the server's resources. Using the CEP of the present invention, data throughput and response time are up to 2.5 times as fast as compared with conventional communication protocols. The CEP also comprises an error handling mechanism that permits detection of and recovery from packet loss and extreme network congestion.

There is therefore provided in accordance with the present invention, in a data communication system having a client and a server side, a method of forming a connection request message to establish a communication channel between the client and the server, comprising the steps of including an Internet Protocol (IP) header field within the connection request message, including User Datagram Protocol (UDP) header field within the connection request message, including a message type field within the connection request message indicating the type of the message, including a last received message number field within the connection request message indicating the number of the last received message, including a client IP address field within the connection request message indicating the IP address of the client, including a client port number field within the connection request message indicating the port number of the client, including a target application identification (ID) field within the connection request message indicating the ID of the target application, including a BUFFER_SIZE field within the connection request message indicating the maximum permitted size of the UDP packet to be transmitted, including a MAX_TX field within the connection request message indicating the maximum number of messages transmitted between acknowledges, including a MAX_RX field within the connection request message indicating the maximum number of messages received between acknowledges, including an ACK_TIMEOUT_TX field within the connection request message indicating the timeout period for retransmission of unacknowledged messages, including an ACK_TIMEOUT_RX field within the connection request message indicating the maximum timeout period for sending an acknowledgment during reception, including an ERROR_LEVEL field within the connection request message indicating the error sensitivity level requested by the client, including a ALIVE_RATE field within the connection request message indicating the keep alive rate requested by the client, and generating the connection request message by combining together the bits representing the IP header field, the UDP header field, the message type field, the last received message number field, the client IP address field, the client port number field, the target application ID field, the BUFFER_SIZE field, the MAX_TX field, the MAX_RX field, the ACK_TIMEOUT_TX field, the ACK_TIMEOUT_RX field, the ERROR_LEVEL field and the ALIVE_RATE field.

There is also provided in accordance with the present invention, in a data communication system having a client and a server side, a method of forming a connection acknowledgment message to establish a communication channel between the client and the server, comprising the steps of including an Internet Protocol (IP) header field within the connection response message, including User Datagram Protocol (UDP) header field within the connection response message, including a message type field within the connection response message indicating the type of the message, including a last received message number field within the connection response message indicating the number of the last received message, including a client IP address field within the connection response message indicating the IP address of the server, including a client port number field within the connection response message indicating the port number of the server, including a target application identification (ID) field within the connection response message indicating the ID of the target application on the client, including a resolved BUFFER_SIZE field within the connection response message indicating the resolved maximum permitted size of the UDP packet to be transmitted, including a MAX_TX field within the connection response message indicating the resolved maximum number of messages transmitted between acknowledges, including a MAX_RX field within the connection response message indicating the resolved number of messages received between acknowledges, including an ACK_TIMEOUT_TX field within the connection response message indicating the resolved timeout period for retransmission of unacknowledged messages, including an ACK_TIMEOUT_RX field within the connection response message indicating the resolved maximum timeout period for sending an acknowledgment, including an ERROR_LEVEL field within the connection response message indicating the error sensitivity level requested by the client, including a ALIVE_RATE field within the connection response message indicating the keep alive rate requested by the server, and generating the connection response message by combining together the bits representing the IP header field, the UDP header field, the message type field, the last received message number field, the server IP address field, the server port number field, the target application ID field, the BUFFER_SIZE field, the MAX_TX field, the MAX_RX field, the ACK_TIMEOUT_TX field, the ACK_TIMEOUT_RX field, the ERROR_LEVEL field and the ALIVE_RATE field.

Also, there is provided in accordance with the present invention, in a data communication system having a client and a server side, a method of forming a send message message to be sent over a communication channel formed between the client and the server, comprising the steps of including an Internet Protocol (IP) header field within the send message message, including User Datagram Protocol (UDP) header field within the send message message, including a message type field within the send message message indicating the type of the message, including a sequential message number field within the send message message indicating the number of the number of the message, including a last received message number field within the send message message indicating the number of the last received message, including a data field within the send message message containing application data from an application executing on the client or the server, and generating the send message message by combining together the bits representing the IP header field, the UDP header field, the message type field, the sequential message number field, the last received message number field and the data field.

Further, there is provided in accordance with the present invention, in a data communication system having a client and a server side, a method of forming a data send message to be sent over a communication channel formed between the client and the server, comprising the steps of including an Internet Protocol (IP) header field within the data send message, including User Datagram Protocol (UDP) header field within the data send message, including a message type field within the data send message indicating the type of the message, including a sequential message number field within the data send message indicating the number of the number of the message, including a last received message number field within the data send message indicating the number of the last received message, including a data field within the data send message containing application data from an application executing on the client or the server, and generating the data send message by combining together the bits representing the IP header field, the UDP header field, the message type field, the sequential message number field, the last received message number field and the data field.

There is also provided in accordance with the present invention, in a data communication system having a client and a server side, a method of forming a message lost message to be sent over a communication channel formed between the client and the server, comprising the steps of including an Internet Protocol (IP) header field within the message lost message, including User Datagram Protocol (UDP) header field within the message lost message, including a message type field within the message lost message indicating the type of the message, including a last received message number field within the message lost message indicating the number of the last received message, including a number of the message lost or corrupted field within the message lost message indicating the number of the message lost or corrupted, including a data field within the message lost message containing data, and generating the message lost message by combining together the bits representing the IP header field, the UDP header field, the message type field, the last received message number field, the number of the message lost or corrupted field and the data field.

In addition, there is provided in accordance with the present invention, in a data communication system having a client and a server side, a method of forming a message error message to be sent over a communication channel formed between the client and the server, comprising the steps of including an Internet Protocol (IP) header field within the message error message, including User Datagram Protocol (UDP) header field within the message error message, including a message type field within the message error message indicating the type of the message, including a last received message number field within the message error message indicating the number of the last received message, including a number of the message lost or corrupted field within the message error message indicating the number of the message lost or corrupted, including a data field within the message error message containing data, and generating the message error message by combining together the bits representing the IP header field, the UDP header field, the message type field, the last received message number field, the number of the message lost or corrupted field and the data field.

There is further provided in accordance with the present invention, in a data communication system having a client and a server side, a method of forming a message alive message to be sent over a communication channel formed between the client and the server, comprising the steps of including an Internet Protocol (IP) header field within the message alive message, including User Datagram Protocol (UDP) header field within the message alive message, including a message type field within the message alive message indicating the type of the message, including a last received message number field within the message alive message indicating the number of the last received message, including a data field within the message alive message containing data, and generating the message alive message by combining together the bits representing the IP header field, the UDP header field, the message type field, the last received message number field and the data field.

Also, there is provided in accordance with the present invention, in a data communication system having a client and a server side, a method of forming a shutdown message to be sent over a communication channel formed between the client and the server, comprising the steps of including an Internet Protocol (IP) header field within the shutdown message, including User Datagram Protocol (UDP) header field within the shutdown message, including a message type field within the shutdown message indicating the type of the message, including a last received message number field within the shutdown message indicating the number of the last received message, including a data field within the shutdown message containing data, and generating the shutdown message by combining together the bits representing the IP header field, the UDP header field, the message type field, the last received message number field and the data field.

There is also provided in accordance with the present invention a data communication system for establishing a network channel over a communication link between a first application executing on a first computer and a second application executing on a second computer, the system comprising a first and second management unit associated with the first and second application, respectively, a first and second registration database associated with the first and second application, respectively, a first Tx process and a first Rx process associated with the first application on the first computer, the first Tx process receiving data to be transmitted over the network channel from the first application, the first Rx process receiving data from the network channel for delivery to the first application, a second Tx process and a second Rx process associated with the second application on the second computer, the second Tx process receiving data to be transmitted over the network channel from the second application, the second Rx process receiving data from the network channel for delivery to the second application, wherein the first management unit establishes and controls the first Tx process and the first Rx process both executing on the first computer, and wherein the second management unit establishes and controls the second Tx process and the second Rx process both executing on the second computer.

BRIEF DESCRIPTION OF THE DRAWINGS

The invention is herein described, by way of example only, with reference to the accompanying drawings, wherein:

FIG. 6 illustrates the format of a CONNECTION_REQ message in the CEP protocol;

DETAILED DESCRIPTION OF THE INVENTION

The protocol, termed Communication Enhancement Protocol (CEP), and method of the present invention serve to improve the transfer rate and response time of data transfers over the Internet. The CEP functions to enhance current TCP/IP communications and applications by providing a transport mechanism that can be placed within Transport Layer 4 or Session Layer 5 of the Open System Interconnection (OSI) Reference Model seven layer communication stack.

It is important to note that the concept of the present invention is not limited to what is described herein but that one skilled in the data communication software art can implement the CEP of the present invention in several ways in addition to adapting it for use on different operating system (OS) platforms. The particular implementation chosen does not effect the basic concept disclosed herein and the interoperability between different implementations.

Figure 1:
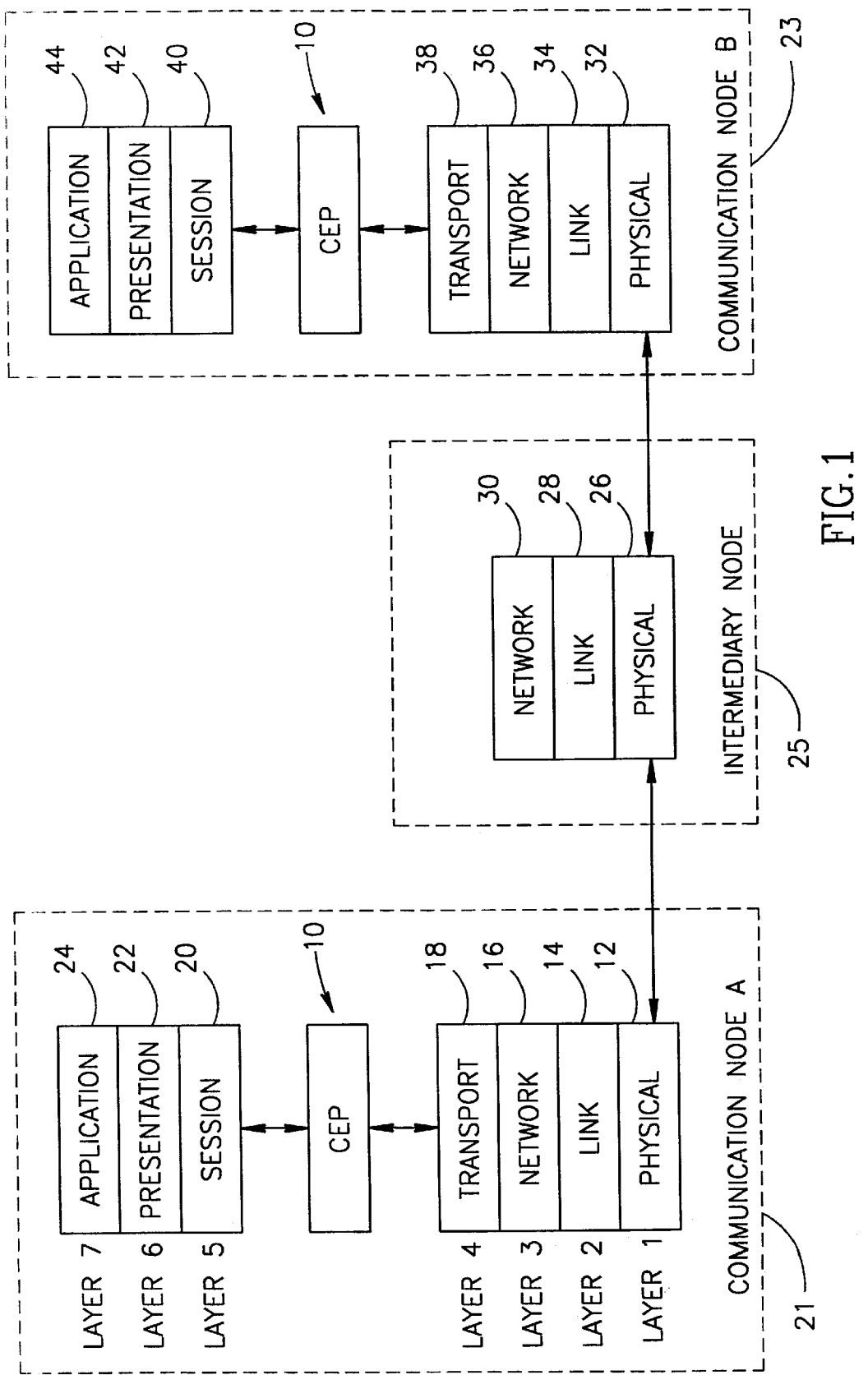
FIG. 1 is a high level block diagram illustrating the CEP of the present invention applied within the context of the Open System Interconnection (OSI) Reference Model seven layer communication stack within two communication nodes in a communication network.

A high level block diagram illustrating the CEP, generally referenced 10, of the present invention applied within the context of the OSI seven layer communication stack within two communication nodes in a communication network is shown in FIG. 1. By way of example only, the CEP is shown within the context of the OSI stack as implemented within two communication nodes. Shown in FIG. 1 is an example communication network comprising a communication node A 21, intermediary node 25 and a communication node B 23. The two communication nodes A and B establish and maintain a communications session whereby data is transmitted between them during the session. The intermediary node 25 represents one or more intermediary hops required to form the communication link between nodes A and B.

The OSI communication stack for node A is shown comprising a Physical Layer 1 (12), Link Layer 2 (14), Network Layer 3 (16), Transport Layer 4 (18), Session Layer 5 (20), Presentation Layer 6 (22) and Application Layer 7 (24). A CEP portion 10 is operative between Layers 4 and 5. Similarly, the OSI communication stack for node B is shown comprising a Physical Layer 1 (32), Link Layer 2 (34), Network Layer 3 (36), Transport Layer 4 (38), Session Layer 5 (40), Presentation Layer 6 (42) and Application Layer 7 (44). As in node A, a CEP portion 10 is operative between Layers 4 and 5. The intermediary node 25 is shown with an abridged stack since only the first three layers, i.e., Physical Layer 1 (26), Link 2 Layer 1 (28), Network Layer 3 (30), are needed to relay packets between nodes A and B.

Figure 2:
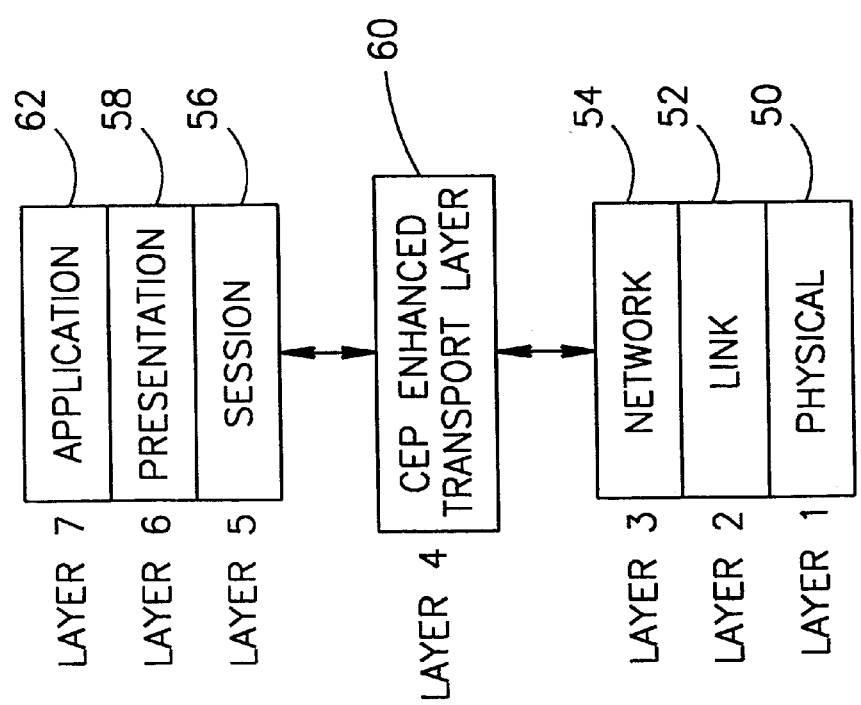
FIG. 2 is a high level block diagram illustrating the CEP of the present invention positioned within the Transport Layer 4 of the OSI seven layer communication stack.

As stated previously, the CEP provides a transport mechanism that can be positioned within Transport Layer 4 or Session Layer 5 of the OSI stack. A high level block diagram illustrating the CEP of the present invention situated within the Transport Layer 4 of the OSI seven layer communication stack is shown in FIG. 2. In this case, the CEP enhanced Transport Layer 60 is an enhanced TCP/IP socket interface that provides Internet users with improved network performance and faster response time over prior art interfaces. Any software application using this stack can take advantage of the improved performance. It is important to note that in order for a user to benefit from the CEP, both ends of the link must have modified communication stacks.

Figure 3:
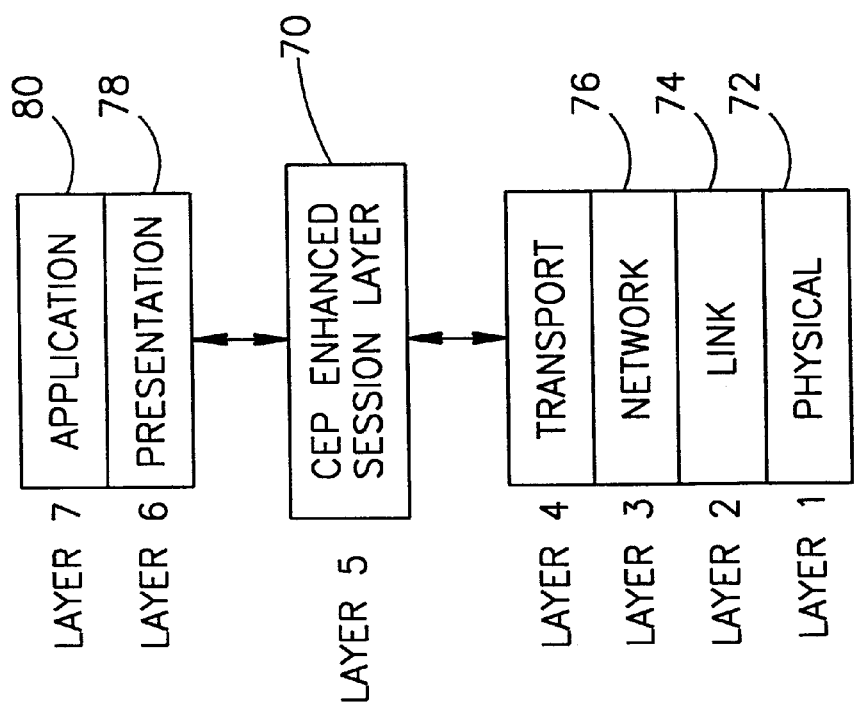
FIG. 3 is a high level block diagram illustrating the CEP of the present invention positioned within the Session Layer 5 of the OSI seven layer communication stack.

Alternatively, the CEP can be placed within the Session Layer 5 of the OSI stack. A high level block diagram illustrating the CEP of the present invention positioned within the Session Layer 5 of the OSI seven layer communication stack is shown in FIG. 3. In this case the CEP enhanced Session Layer 70 can be linked to network applications to enhance their performance. Users can employ the CEP to more efficiently utilize the resources of their servers.

CEP Unit

Figure 4:
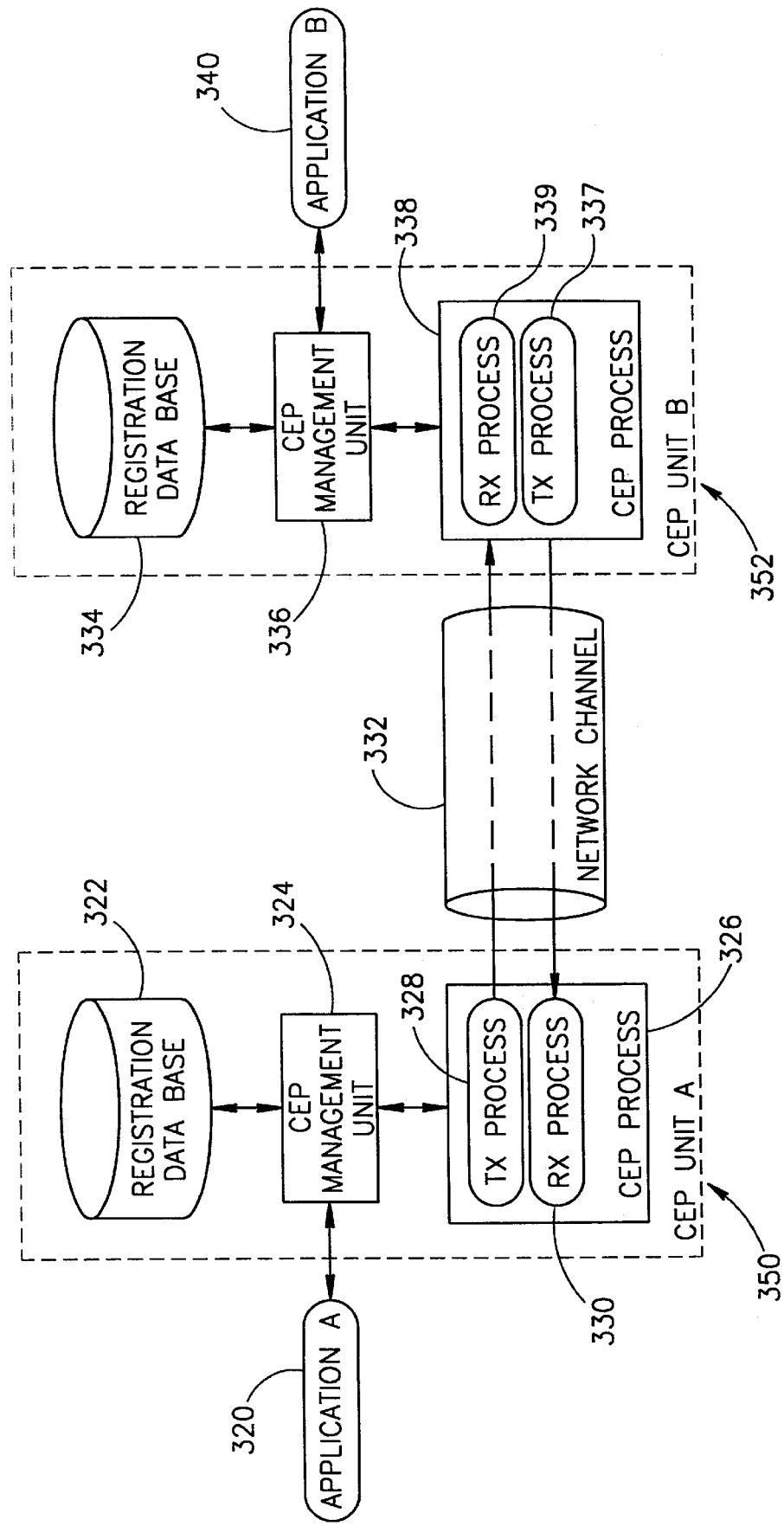
FIG. 4 is a high level block diagram illustrating the processes used to construct a communications session between two applications.

A high level block diagram illustrating the CEP unit for establishing a communications session between two applications is shown in FIG. 4. The CEP unit permits a software application to communicate with another software application via a network channel over an IP network. The CEP units function to establish a network channel between themselves to enable data communications therebetween. With reference to FIG. 4, two applications, application A 320 and application B 340, communicate with each other over a network channel 332. CEP unit A 350 provides the interface between application A and the network channel. Similarly, CEP unit B 352 provides the interface between application B and the network channel.

Data sent through a CEP unit by an application will be received by the destination application as long as the network channel is in an 'OPEN' state. The CEP unit utilizes User Datagram Protocol (UDP) communications to transmit data over the network channel. In addition, the CEP unit monitors the network channel and reports status changes to the application.

CEP unit A 350 comprises a CEP process 326, CEP management unit 324 and a registration database 322. The CEP process 326 comprises a transmit (Tx) process 328 and a receive (Rx) process 330. Similarly, CEP unit B 352 comprises a CEP process 338, CEP management unit 336 and a registration database 334. The CEP process 338 comprises a Tx process 337 and an Rx process 339. The Tx process 328 in CEP unit A communicates with the Rx process 339 in the CEP unit B over the network channel. Likewise, Tx process 337 in CEP unit B communicates with the Rx process 330 in CEP unit A over the network channel.

The CEP management unit functions to establish and maintain the CEP process containing the Tx and Rx processes. It also provides the interface between the user software application and the CEP process. The CEP process provides the interface between the CEP management unit and the network channel. In addition, the CEP management unit maintains the registration database which comprises a table of network users and processes. Each CEP process is capable of accommodating a plurality of applications.

CEP Unit Initialization

Upon initialization, the CEP management unit 324 creates a single CEP process 326 for each network channel 332 requested by the application. The network channel is then registered with the status of 'CLOSED'. It then attempts to establish the network channel with the corresponding CEP management unit on the other end of the connection. If successful, the status field of the network channel is then set to 'OPEN'. Application A 320 is then notified that the network channel was established. Although there is only one application in this particular example, a CEP process may communicate with a plurality of applications. In this, all applications are notified that a network channel was established.

The CEP process 326 is then split into two processes: a transmit (Tx) process 328 and a receive (Rx) process 330. The Tx process waits to receive messages from applications via the CEP management unit that are to be sent over the network channel. Once data to be sent is received, the Tx process generates data transmission and command messages. The Rx process listens on the network channel socket for messages from the CEP process 338 in CEP unit B. Upon receipt of messages, the Rx process transfers the received messages to the CEP management unit which, in turn, forwards them to the appropriate target application, i.e., application A.

CEP Process—Application Communications

As stated previously, the CEP process created by the CEP management unit in the CEP unit provides the interface between the software application requesting communication services and the network channel. The software application address a specific CEP process, created previously by a CEP management unit, using the IP address of the target unit. With reference to the example shown in FIG. 4, assume application B 340 is running on a computer having an assigned IP address of 170.170.3.9. If application A wishes to communicate with application B, it will instruct the CEP management unit 324 to use IP address 170.170.3.9, the address of the CEP process in CEP unit B.

The CEP process 326 handles the messages from the software application in a prioritized manner. Messages with the priority option set will be sent before messages that do not have this option set. A special field in the message header permits applications to set the priority option.

There are two types of messages that are sent between an application and the CEP unit: command messages and data messages. Command messages include a message for shutting down the network channel, for reporting CEP management status, etc. Data messages include a MESSAGE_SEND and a DATA_SEND message type.

In a MESSAGE_SEND message, the data to be sent is contained in the received message memory block. The CEP process transmits these messages immediately upon receipt. A small delay may be introduced in order to permit the CEP process to pack more than one message in the same physical message. After the message is transmitted, the CEP process releases the message memory segment that the message utilized.

In a DATA_SEND message, the data to be transmitted is described by the message. The CEP process transmits the received message, which can include submessages, with the attached data. The message memory segment is released upon completion of the data transmission. The release of the memory segment used for the data portion of the message is dependent upon the particular message parameters.

Each message received by the Rx process, includes, in a field in the header, the destination application number, i.e., the application's handle, and the target queue associated with the message. The Rx process then sends each received message to the CEP management unit which determines the appropriate application to forward it to.

CEP Process—CEP Process Communications

CEP process to CEP process communications provides for reliable communication between applications over the network channel. The communications interface between CEP processes is based on two methods of communication. The first method utilizes CEP process to CEP process messages which are transmitted immediately if the originator is the Tx process or if the originator is the Rx process using a shared memory area. The second method involves dedicated fields in the application messages which are utilized by the CEP processes.

The following message types are used for CEP process to CEP process communications.

| Message Type | Description |
| --- | --- |
| CONNECTION_REQ | connection request (client to server) message |
| CONNECTION_ACK | connection acknowledge message |
| MESSAGE_LOST | indicates that a message was lost or was received out of sequence |
| MESSAGE_ALIVE | keep alive message |
| MBSSAGE_SEND | message containing up to 200 bytes of application data |
| DATA_SBND | message containing up to BUFFER_SIZE bytes of application data |
| MESSAGE_ERROR | indicates the occurrence of a communication error |
| SHUTDOWN | indicates a shutdown of the network channel |

Each of the above message types will be described in more detail below.

Each message in the CEP protocol contains a CEP header which comprises the following fields:
1. Message Type
2. Sequential Message Number
3. Last Received Number Message Number
4. Number of Lost or Corrupt Messages The CEP protocol packet structure is described in more detail below.

The CEP process numbers each message before it is sent over the network channel. A data message and its attached data is considered one message. The receiving CEP process checks whether messages are received in sequence. If a message is received out of sequence it is likely that a message was lost and a MESSAGE_LOST type message is generated containing the list message number and immediately sent to the sending CEP process. Only lost messages are retransmitted by the transmitting Tx process. All subsequent messages received after the expected lost message arrives are kept by the receiving Rx process.

Upon receiving a message, the receiving Rx process updates the last received message number field in the received message's CEP header. The receiving Rx process also checks the checksum value in the sent in the message. If corruption of the message is detected, a MESSAGE_LOST type message is generated and transmitted to the sending Tx process.

The CEP processes on either side of a network channel periodically can verify that the network channel between them is connected and in the OPEN state. Network channel verification is based upon MESSAGE_ALIVE type messages being sent at a periodic rate, previously defined and agreed to by both CEP processes. The Tx process verifies that a message (any message) is transmitted at a rate of preferably no less than 30 seconds. If no application messages are sent a MESSAGE _ALIVE message will be sent. The Rx process verifies reception of a message at the same periodic rate. When the Rx process detects that a message did not arrive within the minimal time window, it notifies the Tx process to stop sending messages. A status change message is then sent to the CEP management unit, the network channel state is changed to 'CLOSED,' and the CEP management unit restarts the initialization process. The two parameters, agreed upon by both CEP units, LOW_WATER_MARK for the Tx window and HIGH_WATER_MARK for the Rx window determine the size of the minimal validation time window.

The CEP process implement a window mechanism which controls the flow of messages. The Tx process monitors the difference between the Sequential Message Number and the Last Received Message Number. When the difference becomes greater than a maximum, MAX_TX, the transmission of messages is halted. The CEP processes also track the number of messages received after the last message transmitted. This count is zeroed by the Tx process and incremented by the Rx process within each CEP process. When the count becomes greater than a maximum, MAX_RX, a MESSAGE_ALIVE message is sent over the network channel.

CEP Protocol Packet Structure

Figure 5:
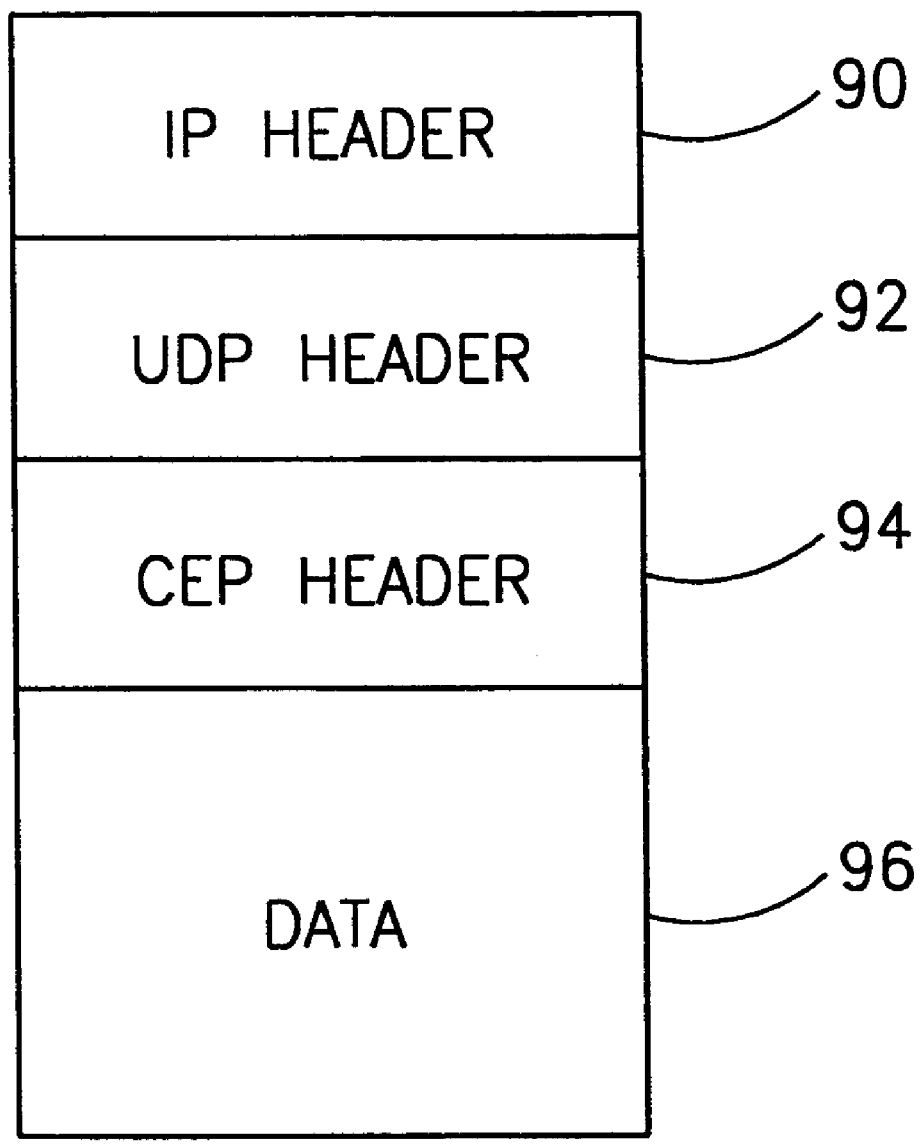
FIG. 5 illustrates the general format of a message in the CEP protocol.

The general format of a message in the CEP protocol is illustrated in FIG. 5. The message comprises an IP header 90, UDP header 92, CEP header 94 and a data portion 96. The IP header and the UDP header are the headers used in the well known IP and UDP standard protocols, respectively. As stated previously, the CEP header comprises fields for Message Type, Sequential Message Number, Last Received Message Number and Number of Lost or Corrupt Messages.

During the establishment of the network channel, i.e., the connection setup process, the following parameters are negotiated and agreed to by the two communicating CEP units.

| Connection Parameter | Description |
| --- | --- |
| BUFFER_SIZE | maximum size of the UDP packet to be transmitted |
| MAX_TX | high water mark for transmission |
| MAX_RX | low water mark for reception |
| ACK_TIMEOUT_TX | maximum acknowledge timeout for transmission |
| ACK_TIMEOUT_RX | maximum acknowledge timeout for reception |
| NUM_RETRANS | number of retransmission without an acknowledge |
| ERROR_LEVEL | level of error sensitivity |
| ALIVE_RATE | keep alive rate |
| DISCONNECT_TIMEOUT | timeout for disconnect on no traffic |
| RETRY_TIMEOUT | timeout between connection retries |
| NUM_RETRIES | number of times to attempt a connection |
| COMPRESS | indicates compression/decompression of data |

The BUFFER_SIZE parameter is the maximum permitted size of the UDP packets that are transmitted over the network channel. This parameter ranges from 100 to 16,384 with the value 1475 preferable. The MAX_TX parameter, described previously, is the high water mark for transmission flow. This parameter determines the maximum number of messages that can be transmitted over the network channel before an acknowledgment must be received. This parameter ranges from 1 to 64 with a value of 9 preferable. The MAX_RX parameter, also described previously, is the low water mark for reception. This parameter determines the number of messages that can be received before an acknowledgment must be sent. This parameter ranges from 1 to the Tx window size minus one and is preferably set at 3.

The ACK_TIMEOUT_TX parameter represents the maximum acknowledge timeout for transmission, i.e., how long to wait before resending messages. This parameter is preferably set in 1 second increments within a range of 1 to 20 seconds with 5 seconds preferable. In addition, it is preferable that ACK_TIMEOUT_TX be relatively greater than both the ACK_TIMEOUT_RX and the ALIVE_RATE parameters. The ACK_TIMEOUT_RX parameter represents the maximum acknowledge timeout for reception, i.e., how long to wait before sending an acknowledgment after a timeout. This parameter is preferably set in 100 millisecond increments within a range of 100 to 10,000 milliseconds with 2,000 milliseconds preferable.

The NUM_RETRANS parameter represents the number of retransmissions permitted without an acknowledgment. Preferably this parameter is within the range of 1 to 20 with a value of 3 preferred. The ERROR_LEVEL parameter represents the level of error sensitivity. The following error levels are defined:

0—reliable (suitable for text files)
1—allow 1 lost message within time period MAX_TX, i.e., the Rx window size
2—allow 2 lost messages within time period MAX_TX, i.e., the Rx window size
3—ignore errors Note that option 0 is preferred for data file transfer. Options 1 to 3 are preferred for time sensitive applications such as voice and video. The ALIVE_RATE parameter represents the keep alive rate and is specified in messages per second with 5 messages per second preferred. A value of zero indicates do not send keep alive messages. The keep alive messages function to enable a server to determine whether the link is alive or not and to terminate links accordingly. The DISCONNECT_TIMEOUT parameter represents the time period for disconnecting upon no traffic being received. When the number of lost keep alive messages exceeds this value, the link is considered broken and the connection is then terminated. It is preferably set within the range of 10 to 255 with 4 * ALIVE_RATE preferable. If ALIVE_RATE is set to zero, it is preferable to set this parameter to 120 seconds. The RETRY_TIMEOUT parameter represents the length of time between each attempt at establishing a connection. It is preferably set within the range of 1 to 255 seconds with 8 seconds preferable. The NUM_RETRIES parameter represents the number of times the client is permitted to attempt reconnections. This parameter is set within the range of 0 to 254 with the value of 255 preferable, indicating an endless number of connect attempts. The COMPRESS parameter indicates whether automatic compression and decompression of data should be performed. For example, a single bit can used, e.g., a '0' to enable compression/decompression and a 1 to disable compression/decompression.

The following table summarizes the ranges and preferred values for the various parameters discussed hereinabove.

| Connection Parameter | Range | Preferred Value |
| --- | --- | --- |
| BUFFER_SIZE | 100–16,384 | 1475 |
| MAX_TX | 1–64 | 9 |
| MAX_RX | 1–Tx Window Size − 1 | 3 |
| ACK_TIMEOUT_TX | 1–20 | 5 |
| ACK_TIMEOUT_RX | 100–10,000 | 2,000 |
| NUM_RETRANS | 1–20 | 3 |
| ERROR_LEVEL | 0–3 | see text |
| ALIVE_RATE | 0–600 | 5 |
| DISCONNECT_TIMEOUT | 10–255 | 4 * ALIVE_RATE |
| RETRY_TIMEOUT | 1–255 | 8 |
| NUM_RETRIES | 0–255 | 255 |
| COMPRESS | 0 or 1 | 0 |

The format of the various messages in the CEP of the present invention will now be described in more detail. The format of a connection request message (CONNECTION_REQ) in the CEP protocol is illustrated in FIG. 6. Connection request messages are generated and sent by the client to the server to establish a network connection. The message comprises a standard IP header 100, standard UDP header 102 and a CEP header. The CEP header comprises a message type 104, i.e., CONNECTION_REQ, DATA_SEND, etc., sequential message number 106 (not used in this message type), last received message number 108 and number of lost or corrupt message 110 (not used in this message type).

The remaining data portion of the CONNECTION_REQ message is 52 bytes long and comprises the client IP address 112, client dynamic port number 114, target application CEP identification 116, maximum size of the UDP packet 118 (BUFFER_SIZE), maximum number of messages transmitted between acknowledges 120 (MAX_TX), maximum number of messages between acknowledges 122 (MAX_RX), timeout for retransmission of unacknowledged messages 124 (ACK_TIMEOUT_TX), maximum time for sending acknowledge 126 (ACK_TIMEOUT_RX), error 128 (not used in this message type), requested error level sensitivity level 130 (ERROR_LEVEL) and client requested keep alive rate 132 (ALIVE_RATE).

Figure 7:
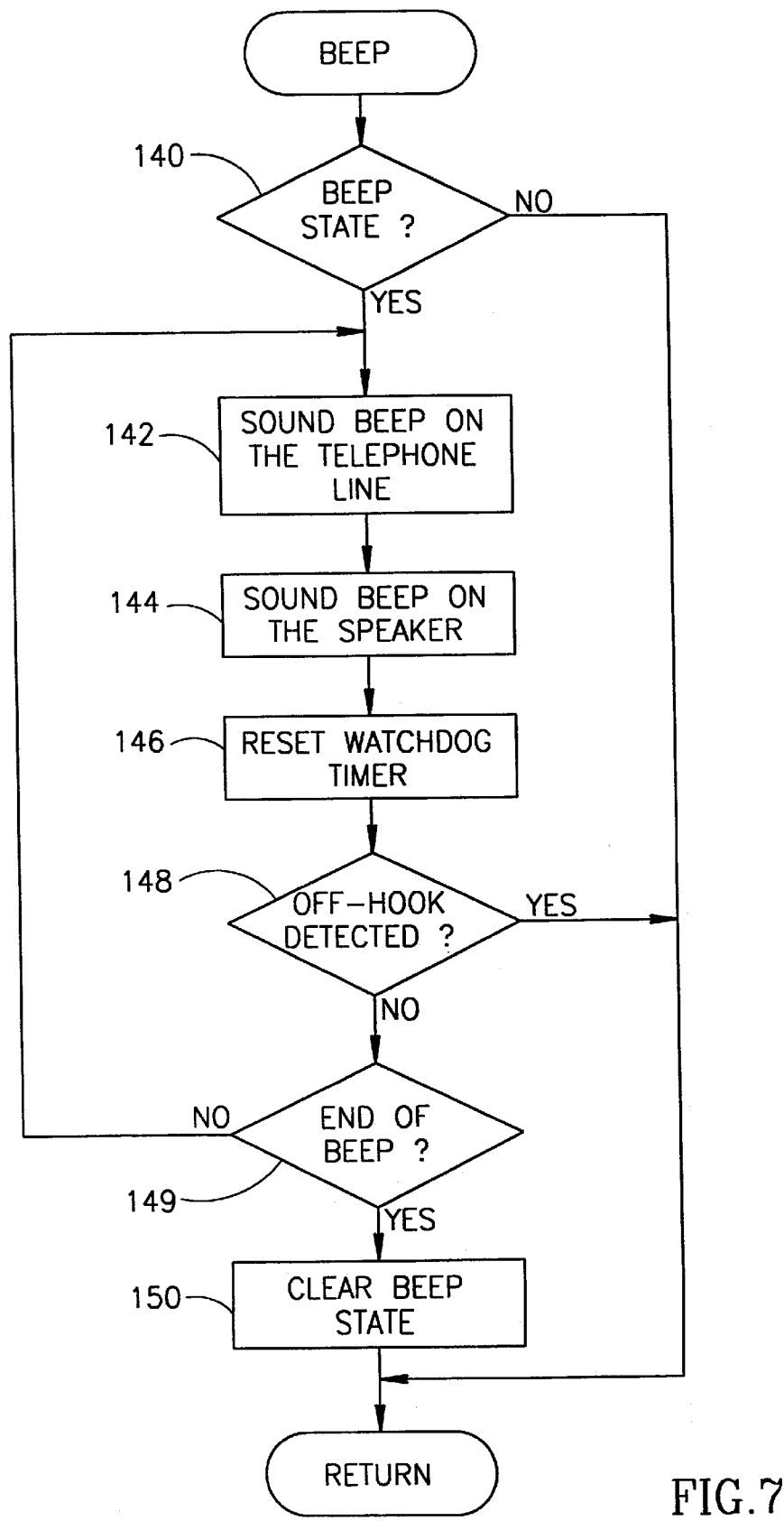
FIG. 7 illustrates the format of a CONNECTION_ACK message in the CEP protocol.

The format of a connection acknowledgment message (CONNECTION_ACK) in the CEP protocol is illustrated in FIG. 7. Connection acknowledgment messages are generated and sent by the server to the client in response to the CONNECTION_REQ message. The message comprises a standard IP header 140, standard UDP header 142 and a CEP header. The CEP header comprises a message type 144, e.g., CONNECTION_REQ, DATA_SEND, etc., sequential message number 146 (not used in this message type), last received message number 148 and number of lost or corrupt message 150 (not used in this message type).

The remaining data portion of the CONNECTION_REQ message comprises the server IP address 152, server dynamic port number 154, resolved target application CEP identification 156, resolved maximum size of the UDP packet 158 (BUFFER_SIZE), resolved maximum number of messages transmitted between acknowledges 160 (MAX_TX), resolved number of messages between acknowledges 162 (MAX_RX), resolved timeout for retransmission of unacknowledged messages 164 (ACK_TIMEOUT_TX), resolved maximum time for sending acknowledge 166 (ACK_TIMEOUT_RX), error 168 (not used in this message type), error level sensitivity level 170 (ERROR_LEVEL) and server requested keep alive rate 172 (ALIVE_RATE).

Figure 8:
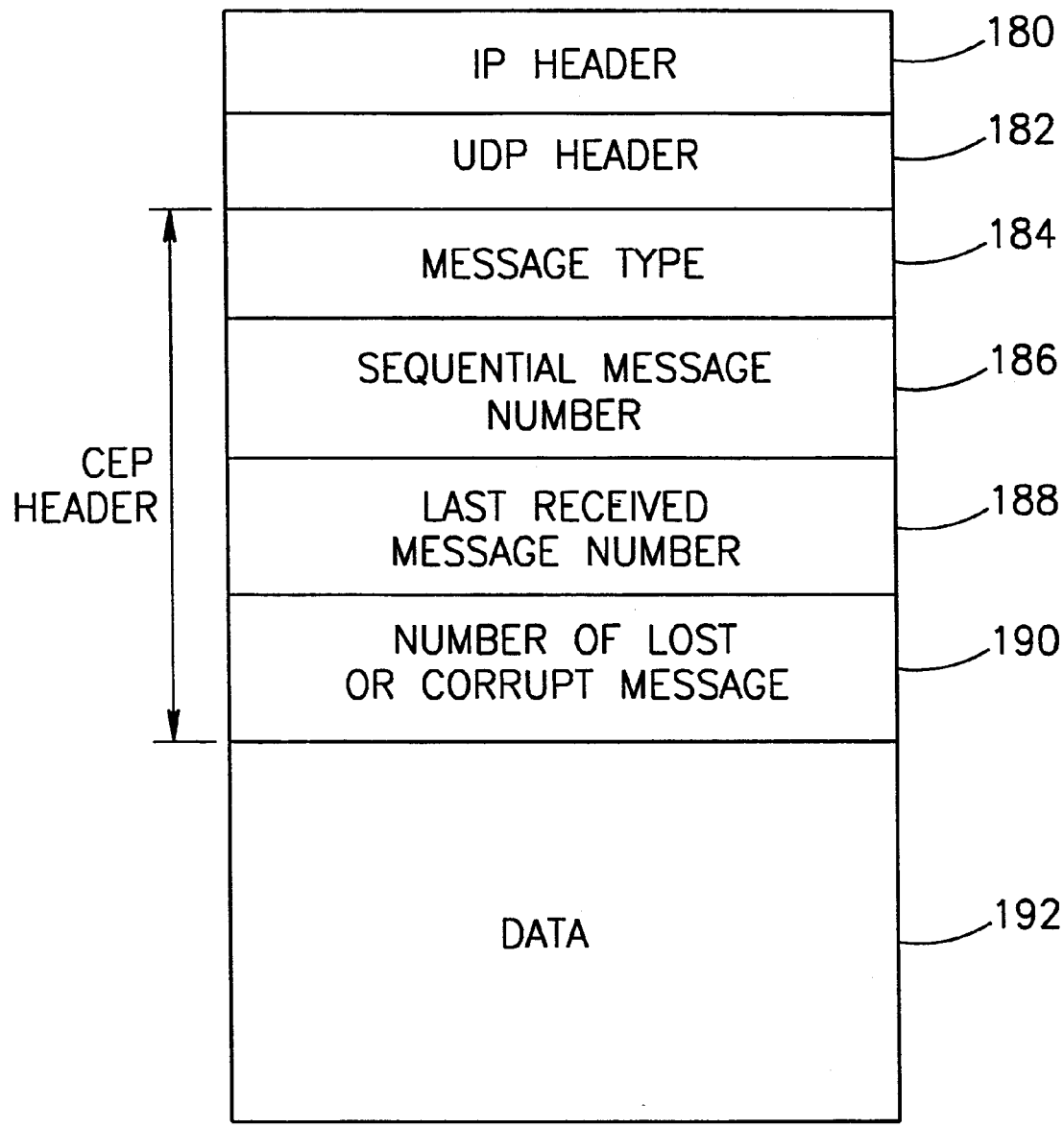
FIG. 8 illustrates the format of a MESSAGE_SEND message in the CEP protocol.

The format of a send message (MESSAGE_SEND) in the CEP protocol is illustrated in FIG. 8. The message comprises a standard IP header 180, standard UDP header 182 and a CEP header. The CEP header comprises a message type 184, e.g., CONNECTION_REQ, DATA_SEND, etc., sequential message number 186, last received message number 188 and number of lost or corrupt message 190 (not used in this message type). The remaining data portion 192 of the MESSAGE_SEND message comprises application data up to BUFFER_SIZE —8.

Figure 9:
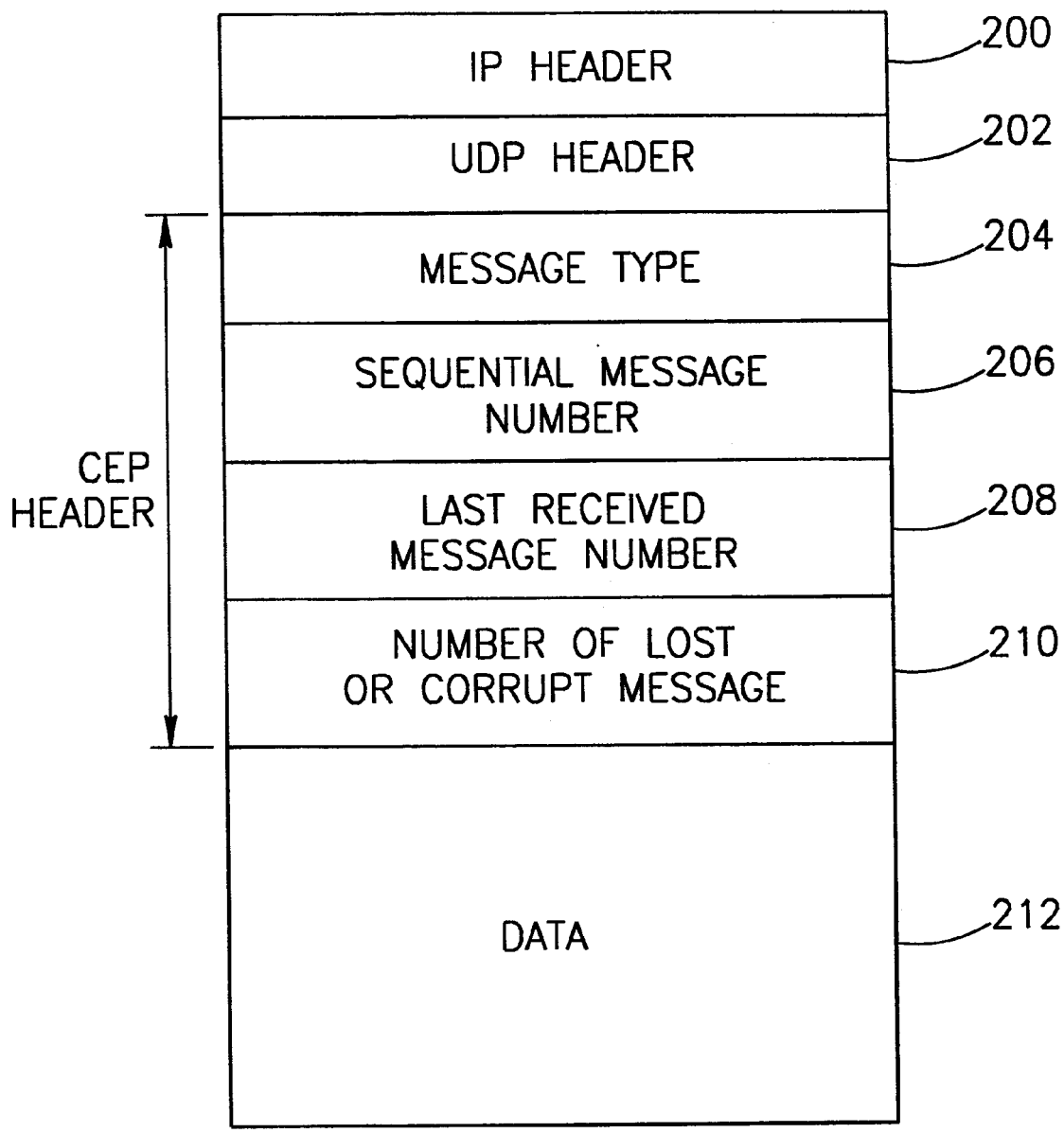
FIG. 9 illustrates the format of a DATA_SEND message in the CEP protocol.

The format of a send data message (DATA_SEND) in the CEP protocol is illustrated in FIG. 9. The message comprises a standard IP header 200, standard UDP header 202 and a CEP header. The CEP header comprises a message type 204, e.g., CONNECTION_REQ, DATA_SEND, etc., sequential message number 206, last received message number 188 and number of lost or corrupt message 210 (not used in this message type). The remaining data portion 212 of the DATA_SEND message comprises application data up to BUFFER_SIZE —8.

Figure 10:
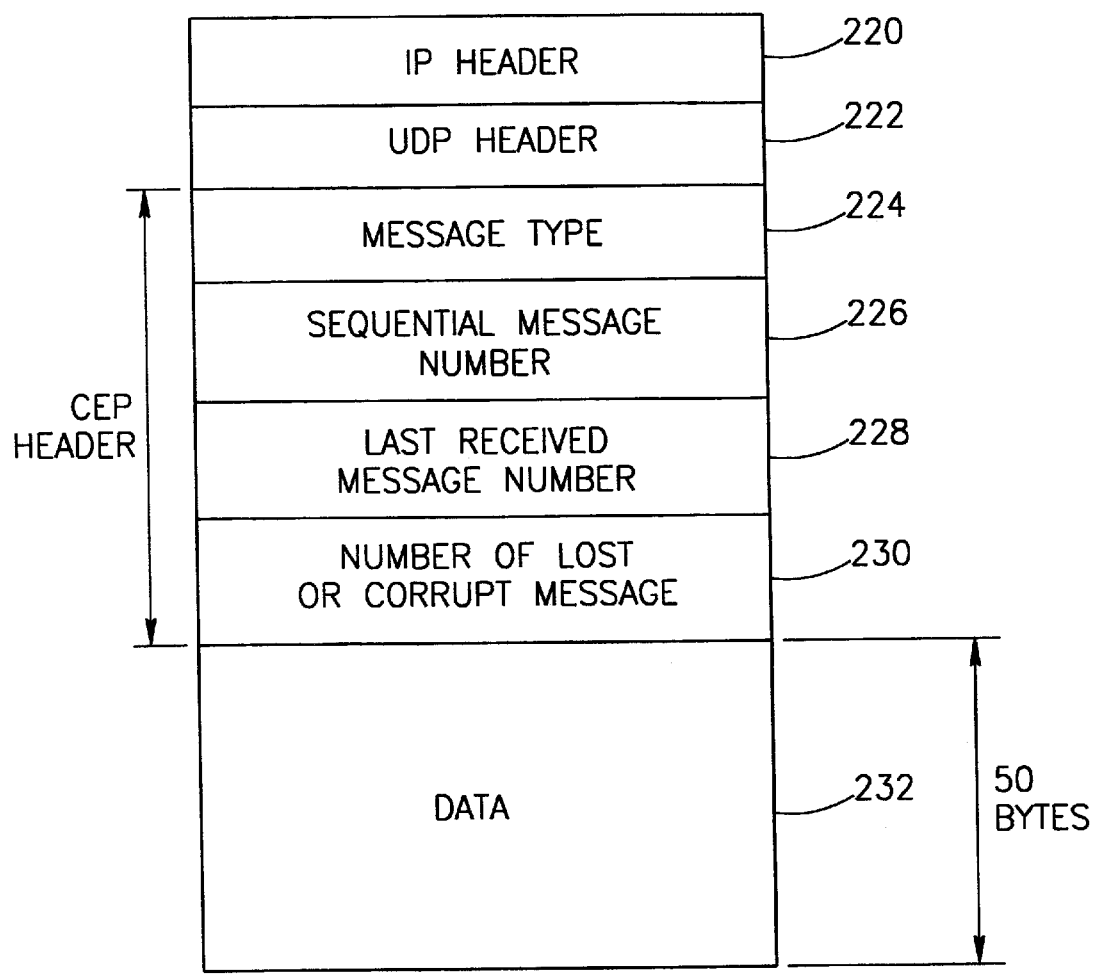
FIG. 10 illustrates the format of a MESSAGE_LOST message in the CEP protocol.

The format of a message lost message (MESSAGE_LOST) in the CEP protocol is illustrated in FIG. 10. The message comprises a standard IP header 220, standard UDP header 222 and a CEP header. The CEP header comprises a message type 224, e.g., CONNECTION_REQ, DATA_SEND, etc., sequential message number 226 (not used in this message type), last received message number 228 and number of lost or corrupt message 230. The remaining data portion 232 of the MESSAGE_LOST message comprises 50 bytes of data.

Figure 11:
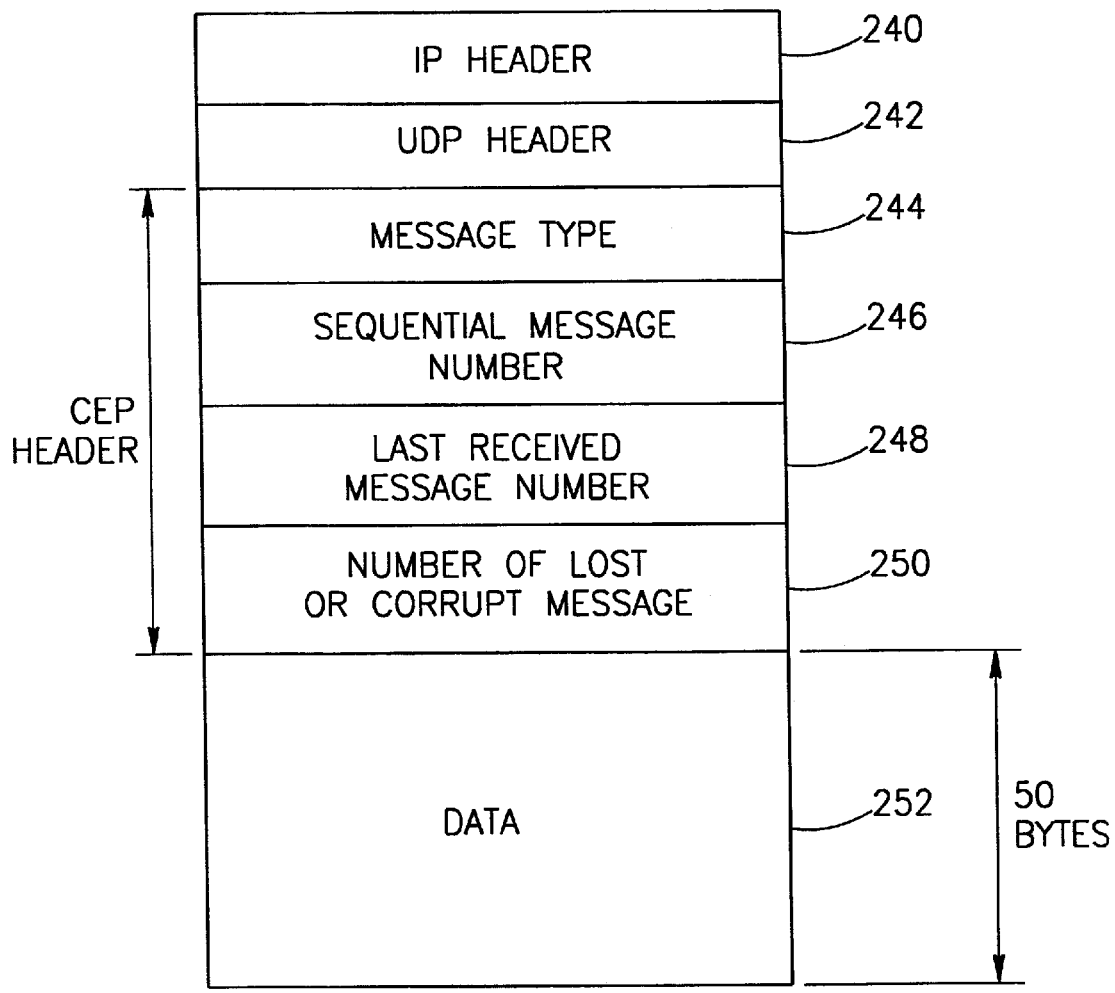
FIG. 11 illustrates the format of a MESSAGE_ERROR message in the CEP protocol.

The format of a message error message (MESSAGE_ERROR) in the CEP protocol is illustrated in FIG. 11. The message comprises a standard IP header 240, standard UDP header 242 and a CEP header. The CEP header comprises a message type 244, e.g., CONNECTION_REQ, DATA_SEND, etc., sequential message number 246 (not used in this message type), last received message number 248 and number of lost or corrupt message 250. The remaining data portion 252 of the MESSAGE_ERROR message comprises 50 bytes of data.

Figure 12:
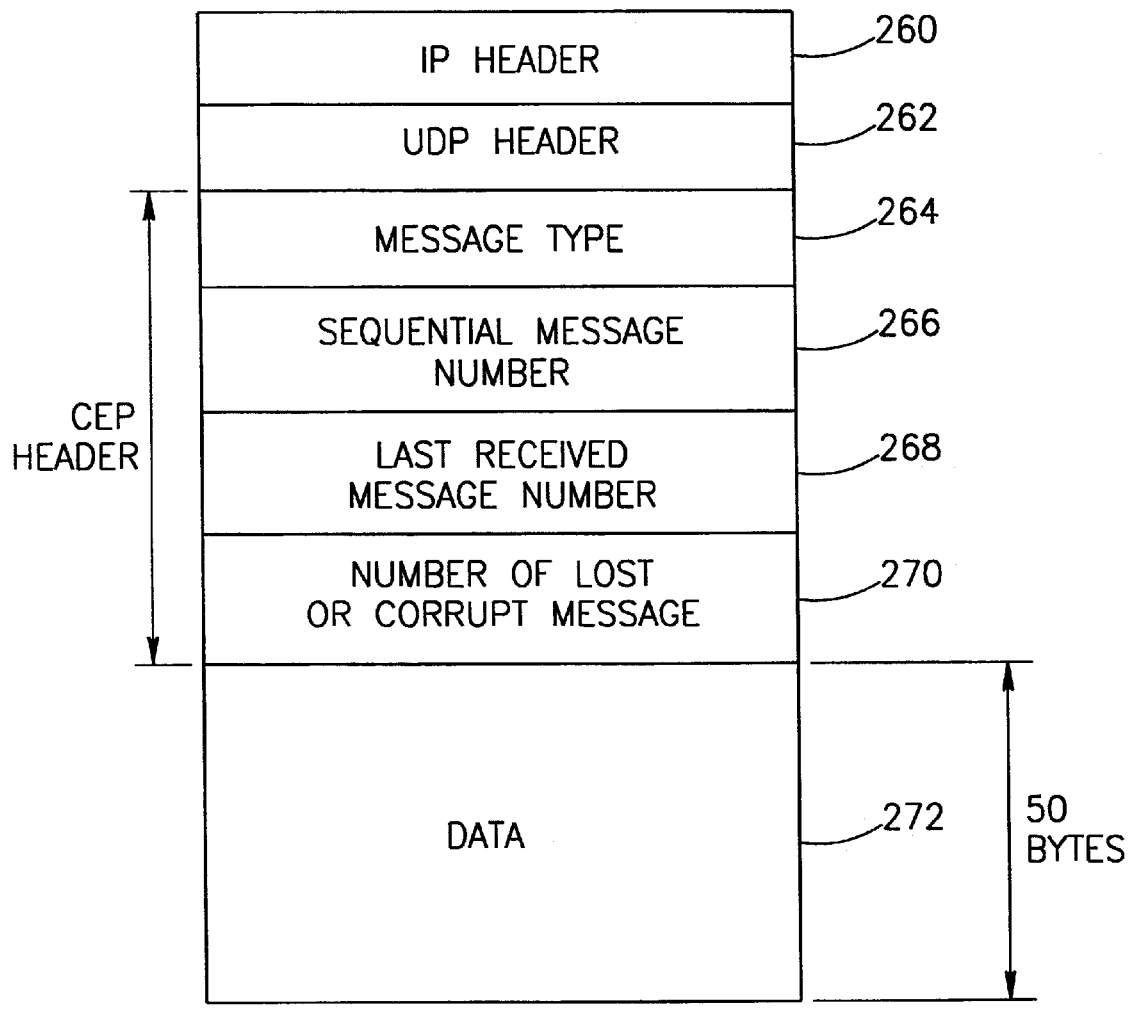
FIG. 12 illustrates the format of a MESSAGE_ALIVE message in the CEP protocol.

The format of a message alive message (MESSAGE_ALIVE) in the CEP protocol is illustrated in FIG. 12. The message comprises a standard IP header 260, standard UDP header 262 and a CEP header. The CEP header comprises a message type 264, e.g., $CONNECTION_{13}$ REQ, DATA_SEND, etc., sequential message number 266 (not used in this message type), last received message number 268 and number of lost or corrupt message 270 (not used in this message type). The remaining data portion 272 of the MESSAGE_ALIVE message comprises 50 bytes of data.

Figure 13:
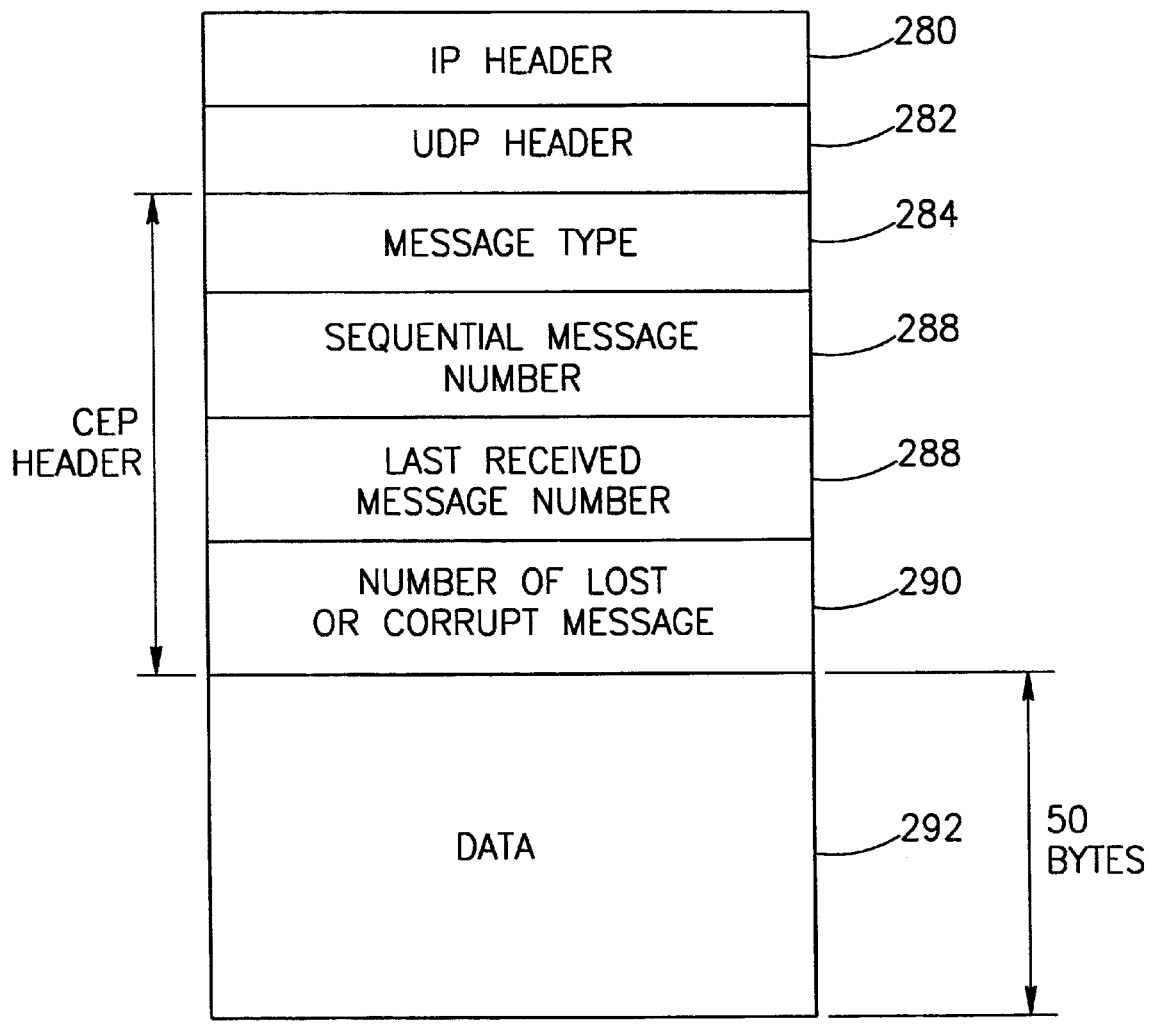
FIG. 13 illustrates the format of a SHUTDOWN message in the CEP protocol.

The format of a shutdown message (SHUTDOWN) in the CEP protocol is illustrated in FIG. 13. The message comprises a standard IP header 280, standard UDP header 282 and a CEP header. The CEP header comprises a message type 284, e.g., CONNECTION_REQ, DATA_SEND, etc., sequential message number 286 (not used in this message type), last received message number 288 and number of lost or corrupt message 290. The remaining data portion 292 of the SHUTDOWN message comprises 50 bytes of data.

Figure 14:
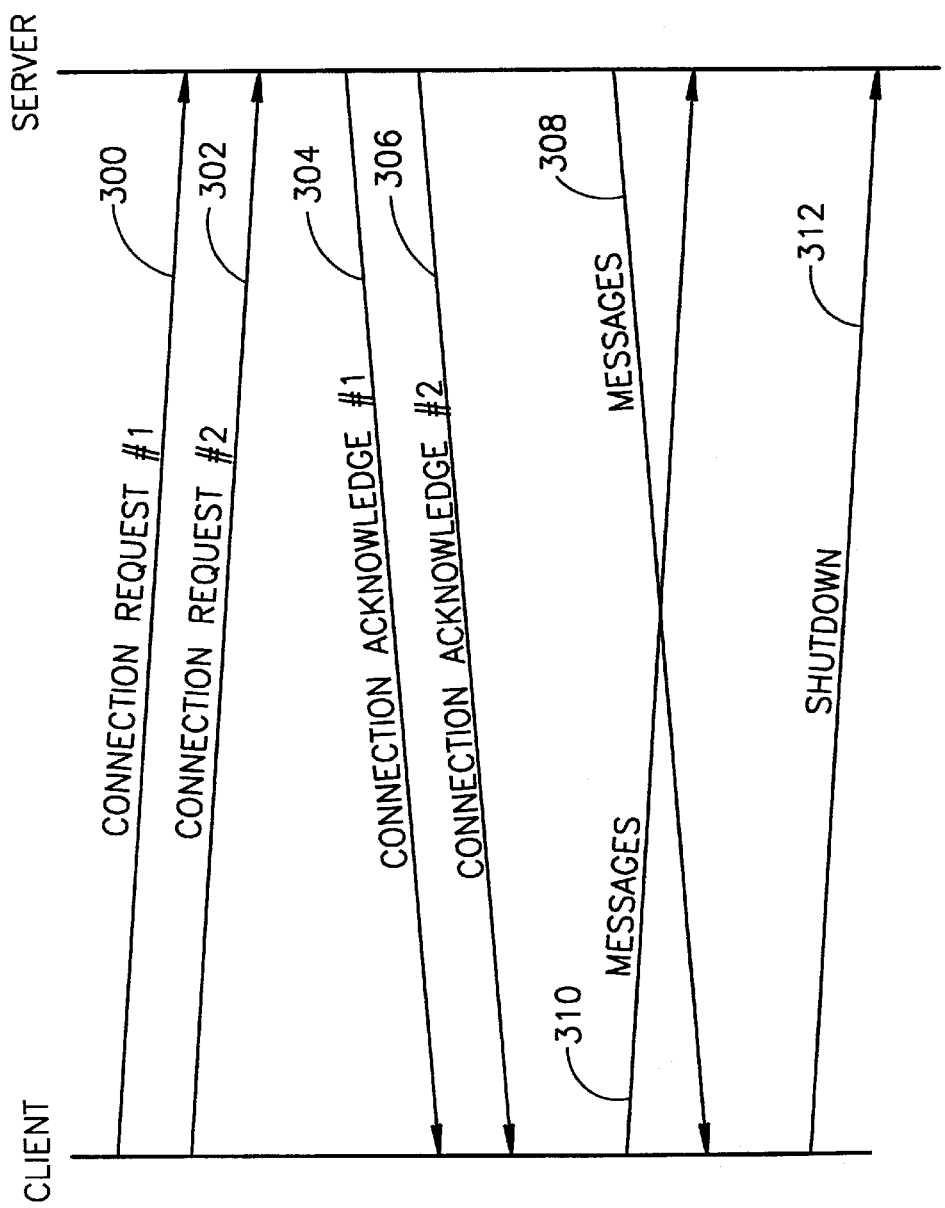
FIG. 14 illustrates the message sequencing between two communicating entities as a function of time.

The establishment of a connection between two CEP processes will be described in more detail with reference to FIGS. 4 and 14. FIG. 14 contains a diagram illustrating the message sequencing between two communicating entities as a function of time. One skilled in the communication art would realize that other implementations may support several method of connection establishment in order to achieve compatibility with existing TCP connections and firewalls. The method of connection setup for the general case is presented below.

The client CEP process 326 (FIG. 4) initiates a connection request with the server CEP process 352 by sending a first CONNECTION_REQ message to the server. This is represented in FIG. 14 by the top left arrow labeled CONNECTION REQUEST #1 300. Immediately thereafter a second CONNECTION_REQ message identical to the first is sent to the server. This is represented in the Figure by the left arrow labeled CONNECTION REQUEST #2 302. Two identical connection request messages are sent to reduce the chances that the server does receive the message, thus improving reliability.

The server upon receiving the connection request message generates two identical connection acknowledgment CONNECTION_ACK messages and sends them to the client. This is represented in the Figure by the two right arrows labeled CONNECTION ACKNOWLEDGEMENT #1 304 and #2 306. The connection request is ignored by the server if a connection to the same IP address and port already exists.

Once the communication channel is established, both sides begin sending messages to each other upon requests from their respective applications. In addition, messages are sent upon expiration of the keep alive timeout timers. Each side sends up to MAX_TX messages without waiting for an acknowledgment. When the receiving side receives MAX_RX messages, it sends an acknowledgment message to the other side thus permitting the transmitting side to send an additional MAX_RX messages. All data messages, i.e., messages of type MESSAGE_SEND, DATA_SEND, are numbered and the receiving side expects to receive them in sequence.

Acknowledgments are sent as part of a MESSAGE_SEND or DATA_SEND message when both sides are sending and receiving data. During one way data flow, the receiving side sends MESSAGE_ALIVE messages after (1) MAX_RX messages are received and not acknowledged and (2) upon the termination of the keep alive timeout, i.e., ACK_TIMEOUT_RX, from the last message sent.

Messages that become lost are handled in accordance with the method used to detect that they are lost. When the receiving side detects that a message was lost, it sends a MESSAGE_LOST message with the number of the messages that were lost and each of their messages numbers to the transmitting side. The transmitting side than resends the specific messages.

When the ACK_TIMEOUT_TX timer expires, the transmitting side assumes that all messages which were not acknowledged were lost. It then begins to resend them. The size of the MAX_TX window is decremented to MAX_RX until all messages are resent. Subsequently MAX_TX is increased. This process is repeated NUM_RETRANS times.

UDP, IP and local system type errors are handled according to their type. Indications of an error condition cause the communication network channel to close and are reported to the application.

While the invention has been described with respect to a limited number of embodiments, it will be appreciated that many variations, modifications and other applications of the invention may be made.

What is claimed is:

1. In a data communication system having a client and a server side, a method of forming a connection request message to establish a communication channel between said client and said server, comprising the steps of:

including an Internet Protocol (IP) header field within said connection request message;

including User Datagram Protocol (UDP) header field within said connection request message;

including a message type field within said connection request message indicating the type of said message;

including a last received message number field within said connection request message indicating the number of the last received message;

including a client IP address field within said connection request message indicating the IP address of said client;

including a client port number field within said connection request message indicating the port number of said client;

including a target application identification (ID) field within said connection request message indicating the ID of the target application;

including a BUFFER_SIZE field within said connection request message indicating the maximum permitted size of the UDP packet to be transmitted;

including a MAX_TX field within said connection request message indicating the maximum number of messages transmitted between acknowledges;

including a MAX_RX field within said connection request message indicating the maximum number of messages received between acknowledges;

including an ACK_TIMEOUT_TX field within said connection request message indicating the timeout period for retransmission of unacknowledged messages;

including an ACK_TIMEOUT_RX field within said connection request message indicating the maximum timeout period for sending an acknowledgment during reception;

including an ERROR_LEVEL field within said connection request message indicating the error sensitivity level requested by said client;

including a ALIVE_RATE field within said connection request message indicating the keep alive rate requested by said client; and generating said connection request message by combining together the bits representing said IP header field, said UDP header field, said message type field, said last received message number field, said client IP address field, said client port number field, said target application ID field, said BUFFER_SIZE field, said MAX_TX field, said MAX_RX field, said ACK_TIMEOUT_TX field, said ACK_TIMEOUT_RX field, said ERROR$_{13}$ LEVEL field and said ALIVE_RATE field.

2. In a data communication system having a client and a server side, a method of forming a connection acknowledgment message to establish a communication channel between said client and said server, comprising the steps of:

including an Internet Protocol (IP) header field within said connection response message;

including User Datagram Protocol (UDP) header field within said connection response message;

including a message type field within said connection response message indicating the type of said message;

including a last received message number field within said connection response message indicating the number of the last received message;

including a client IP address field within said connection response message indicating the IP address of said server;

including a client port number field within said connection response message indicating the port number of said server;

including a target application identification (ID) field within said connection response message indicating the ID of the target application on said client;

including a resolved BUFFER_SIZE field within said connection response message indicating the resolved maximum permitted size of the UDP packet to be transmitted;

including a MAX_TX field within said connection response message indicating the resolved maximum number of messages transmitted between acknowledges;

including a MAX_RX field within said connection response message indicating the resolved number of messages received between acknowledges;

including an ACK_TIMEOUT_TX field within said connection response message indicating the resolved timeout period for retransmission of unacknowledged messages;

including an ACK_TIMEOUT_RX field within said connection response message indicating the resolved maximum timeout period for sending an acknowledgment;

including an ERROR_LEVEL field within said connection response message indicating the error sensitivity level requested by said client;

including a ALIVE_RATE field within said connection response message indicating the keep alive rate requested by said server; and generating said connection response message by combining together the bits representing said IP header field, said UDP header field, said message type field, said last received message number field, said server IP address field, said server port number field, said target application ID field, said BUFFER_SIZE field, said MAX_TX field, said MAX_RX field, said ACK_TIMEOUT_TX field, said ACK_TIMEOUT_RX field, said ERROR_LEVEL field and said ALIVE_RATE field.

3. In a data communication system having a client and a server side, a method of forming a data send message to be sent over a communication channel formed between said client and said server, comprising the steps of:

including an Internet Protocol (IP) header field within said data send message;

including User Datagram Protocol (UDP) header field within said data send message;

including a message type field within said data send message indicating the type of said message;

including a sequential message number field within said data send message indicating the number of the number of said message;

including a last received message number field within said data send message indicating the number of the last received message;

including a data field within said data send message containing application data from an application executing on said client or said server;

generating said data send message by combining together the bits representing said IP header field, said UDP header field, said message type field, said sequential message number field, said last received message number field and said data field; and wherein said data send message is part of a transport mechanism positioned between Transport Layer 4 or Session Layer 5 of the Open System Interconnet (OSI) stack.

4. In a data communication system having a client and a server side, a method of forming a message lost message to be sent over a communication channel formed between said client and said server, comprising the steps of:

including an Internet Protocol (IP) header field within said message lost message;

including User Datagram Protocol (UDP) header field within said message lost message;

including a message type field within said message lost message indicating the type of said message;

including a last received message number field within said
message lost message indicating the number of the last
received message;

including a number of the message lost or corrupted field
within said message lost message indicating the number of the message lost or corrupted;

including a data field within said message lost message
containing data;

generating said message lost message by combining
together the bits representing said IP header field, said
UDP header field, said message type field, said last
received message number field, said number of the
message lost or corrupted field and said data field; and wherein said message lost message is part of a transport
mechanism positioned between Transport Layer 4 or
Session Layer 5 of the Open System Interconnet (OSI)
stack.

5. In a data communication system having a client and a
server side, a method of forming a message error message to
be sent over a communication channel formed between said
client and said server, comprising the steps of:

including an Internet Protocol (IP) header field within said
message error message;

including User Datagram Protocol (UDP) header field
within said message error message;

including a message type field within said message error
message indicating the type of said message;

including a last received message number field within said
message error message indicating the number of the
last received message;

including a number of the message lost or corrupted field
within said message error message indicating the number of the message lost or corrupted;

including a data field within said message error message
containing data;

generating said message error message by combining
together the bits representing said IP header field, said
UDP header field, said message type field, said last
received message number field, said number of the
message lost or corrupted field and said data field; and wherein said message error message is part of a transport
mechanism positioned between Transport Layer 4 or
Session Layer 5 of the Open System Interconnet (OSI)
stack.

6. In a data communication system having a client and a
server side, a method of forming a message alive message to
be sent over a communication channel formed between said
client and said server, comprising the steps of:

including an Internet Protocol (IP) header field within said
message alive message;

including User Datagram Protocol (UDP) header field
within said message alive message;

including a message type field within said message alive
message indicating the type of said message;

including a last received message number field within said
message alive message indicating the number of the
last received message;

including a data field within said message alive message
containing data;

generating said message alive message by combining
together the bits representing said IP header field, said
UDP header field, said message type field, said last
received message number field and said data field; and wherein said message alive message is part of a transport
mechanism positioned between Transport Layer 4 or
Session Layer 5 of the Open System Interconnet (OSI)
stack.

7. In a data communication system having a client and a
server side, a method of forming a shutdown message to be
sent over a communication channel formed between said
client and said server, comprising the steps of:

including an Internet Protocol (IP) header field within said
shutdown message;

including User Datagram Protocol (UDP) header field
within said shutdown message;

including a message type field within said shutdown
message indicating the type of said message;

including a last received message number field within said
shutdown message indicating the number of the last
received message;

including a data field within said shutdown message
containing data;

generating said shutdown message by combining together
the bits representing said IP header field, said UDP
header field, said message type field, said last received
message number field and said data field; and wherein said shutdown message is part of a transport
mechanism positioned between Transport Layer 4 or
Session Layer 5 of the Open System Interconnet (OSI)
stack.

8. In a data communication system having a client and a
server side, a method of forming a send_message message
to be sent over a communication channel formed between
said client and said server, comprising the steps of:

including an Internet Protocol (IP) header field within said
send_message message;

including User Datagram Protocol (UDP) header field
within said send_message message;

including a message type field within said send_message
message indicating the type of said message;

including a sequential message number field within said
send_message message indicating the number of said
message;

including a last received message number field within said
send_message message indicating the number of the
last received message;

including a data field within said send_message message
containing application data from an application executing on said client or said server;

generating said send_message message by combining
together the bits representing said IP header field, said
UDP header field, said message type field, said sequential message number field, said last received message
number field and said data field; and wherein said send message message is part of a transport
mechanism positioned between Transport Layer 4 or
Session Layer 5 of the Open System Interconnet (OSI)
stack.

* * * * *